United States Patent [19]

Wang

[11] Patent Number: 5,802,079

[45] Date of Patent: Sep. 1, 1998

[54] TRANSMISSION SYSTEM FOR DIGITAL AUDIO BROADCASTING

[75] Inventor: Jin-Der Wang, Ocean, N.J.

[73] Assignee: Lucent Technologies Inc., Murray Hill, N.J.

[21] Appl. No.: 628,118

[22] Filed: Apr. 4, 1996

[51] Int. Cl.[6] .................................................. H04L 7/00
[52] U.S. Cl. ......................... 371/42; 375/365; 375/366; 375/367
[58] Field of Search ........................ 371/42; 375/365, 375/366, 367, 368

[56] References Cited

U.S. PATENT DOCUMENTS

| 4,554,540 | 11/1985 | Mori et al. | 340/825.44 |
| 4,839,639 | 6/1989 | Sato et al. | 340/825.44 |
| 5,260,972 | 11/1993 | Wang | 375/58 |
| 5,406,586 | 4/1995 | Wang | 375/96 |
| 5,592,518 | 1/1997 | Davis et al. | 375/368 |
| 5,666,378 | 9/1997 | Marchetto et al. | 375/222 |

OTHER PUBLICATIONS

World Media Expo News, "AT&T System Broadcasts Live", by Alan Carter, Sep. 7, 1995.

World Media Expo News, "Reaction in on AT&T DAB Demo", by Alan Carter, Sep. 8, 1995.

*Primary Examiner*—Stephen M. Baker
*Attorney, Agent, or Firm*—Joseph J. Opalach

[57] ABSTRACT

A digital audio broadcasting (DAB) system includes a radio-frequency (RF) transmitter and a corresponding RF receiver that includes a frame detection circuit for providing a frame synchronization signal. The latter is used to inhibit a Reed-Solomon decoder from correcting data in any frame for which there was no synchronization.

6 Claims, 11 Drawing Sheets

SIGNAL CONSTELLATION

CHANNEL SYNC AND SOUNDING
DATA SYMBOL
INTERLEAVER (SYMBOL CLOCK) SYNC

+7PN FOR INTERLEAVER SYNC
−7PN FOR SYMBOL CLOCK SYNC

W: THE LENGTH OF EACH PEAK MATCH PATTERN
N: THE LENGTH OF EACH QUIET MATCH PATTERN

ACQUISITION MODE

CHANNEL SOUNDING PROCESS

CHANNEL SOUNDING PROCESS

5,802,079

TRANSMISSION SYSTEM FOR DIGITAL AUDIO BROADCASTING

CROSS-REFERENCE TO RELATED APPLICATIONS

Related subject matter is disclosed in five commonly assigned, U.S. Patent applications of Wang and Langberg, entitled "A Transmission Syste for Digital Audio Broadcasting," Ser. Nos. 08/628,219, 08/628,117, 08/628,220, now U.S. Pat. No. 5,748,686, Ser. Nos. 08/628,120, and 08/628,119, now U.S. Pat. No. 5,751,774 respectively.

BACKGROUND OF THE INVENTION

The present invention relates to communications systems, and, more particularly, to audio broadcasting.

Significant advancements in source coding make it possible to compress stereo sound by about a factor of 10 without a noticeable loss in quality after decompression. One application that can benefit from this advancement is broadcasting. FM broadcasting provided a significant step in quality improvement over AM radio. In the past ten years, many researchers have felt that another step could be taken to further improve the quality of sound transmission. This has resulted in the effort now known as digital audio broadcasting (DAB) or digital audio radio (DAR).

However, while it was a significant achievement for source coding researchers to be able to compress stereo sound from about 1.4 Mega-bits/second (Mb/s) to 160 kilobits/second (kb/s), it is not a simple task for data communications researchers to design a reliable wireless digital data link in a highly mobile environment as presented, e.g., by a radio receiver in a moving car. This is because the delivery of a communications system like DAB is complicated by the fact that the communications channel is highly time-varying and severely distorted by the effects of multipath and Doppler shift. As such, the targeted error rate and the rate of outage is much more rigid than a digital cellular telephone application.

SUMMARY OF THE INVENTION

In accordance with the principles of the invention, a lack of frame synchronization in a receiver is used to represent a signal-to-noise condition of a communications channel for inhibiting error correcting circuitry from correcting errors in a received frame.

In an embodiment of the invention, a DAB system includes an RF transmitter and a corresponding RF receiver that includes a frame detection circuit for providing a frame synchronization signal. The latter is used to inhibit a Reed-Solomon decoder from correcting data in any frame for which there was no synchronization. This is independent of the actual error level in the subject frame.

DETAILED DESCRIPTION

Figure 1:
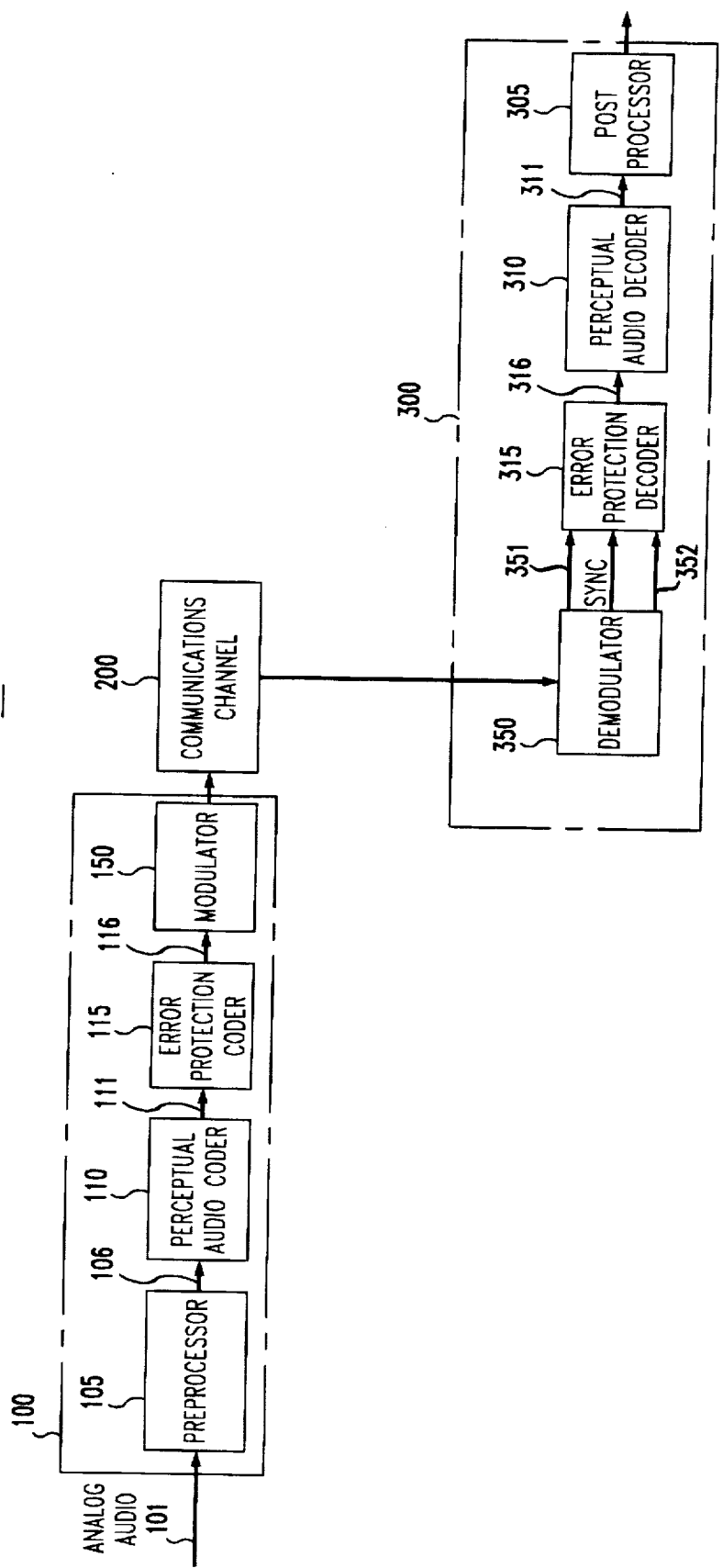
FIG. 1 shows an illustrative high-level block diagram of a digital audio broadcasting communications system embodying the principles of the invention.

FIG. 1 shows a high-level block diagram of a DAB communications system 10 embodying the principles of the invention. DAB communications system 10 comprises transmitter 100, communications channel 200, and receiver 300. Before describing the details of the inventive concept, a general overview of the operation of DAB communications system 10 will be given. Also, perceptual audio coding is well-known and will not be described in detail. For example, see U.S. Pat. No. 5,285,498, entitled "Method and Apparatus for Coding Audio Signals Based on Perceptual Model," issued Feb. 8, 1994 to Johnston. Other such coding techniques are described, e.g., in J. P. Princen and A. B. Bradley, "Analysis/Synthesis Filter Bank Design Based on Time Domain Aliasing Cancellation," IEEE Trans. ASSP, Vol. 34, No. 5, October, 1986; E. F. Schroder and J. J. Platte, "'MSC': Stereo Audio coding with CD-Quality and 256 kBIT/SEC," IEEE Trans. on Consumer Electronics, Vol. CE-33, No. 4, November 1987; Johnston, "Transform Coding of Audio Signals Using Noise Criteria," IEEE J.S.C.A., Vol. 6, No. 2, February 1988; and U.S. Pat. No. 5,341,457, entitled "Perceptual Coding of Audio Signals," issued Aug. 23, 1994 to Hall et al.

In FIG. 1, an analog audio signal 101 is fed into preprocessor 105 where it is sampled (typically at 48 Khz) and converted into a digital pulse code modulation (PCM) signal 106 (typically 16 bits) in standard fashion. The PCM signal 106 is fed into a perceptual audio coder (PAC) 110, which compresses the PCM signal and outputs compressed PAC signal 111. The latter represents a 170 kb/s bit stream of which 10 kb/s represents a control channel for ancillary data and 160 kb/s represents the compressed audio signal. Compressed PAC signal 111 is applied to error protection coder 115, which applies a Reed-Solomon code to provide 100% redundancy to compressed PAC signal 111. It is assumed that error protection coder 115 also includes a buffer and interleaver (not shown) to further combat the effects of communications channel 200. The result is encoded signal 116, which represents a 340 kb/s interleaved data stream and where each interleaver block contains 320 ms of data (1088 kbits). The encoded signal 116 is applied to modulator 150, which, as described further below, develops a signal in accordance with the principles of the invention for transmission over communications channel 200. From communications channel 200, demodulator 350, of receiver 300, recovers an encoded signal 351 in accordance with the principles of the invention (described below). Encoded signal 351 is fed into error protection decoder 315, which operates in a complementary fashion to error protection coder 115 to provide compressed PAC signal 316 to perceptual audio decoder 310. The latter decompresses the compressed PAC signal and outputs a PCM signal 311. This signal is fed into a post-processor 305, which creates an analog representation that is, ideally, identical to analog audio signal 101.

Figure 2:
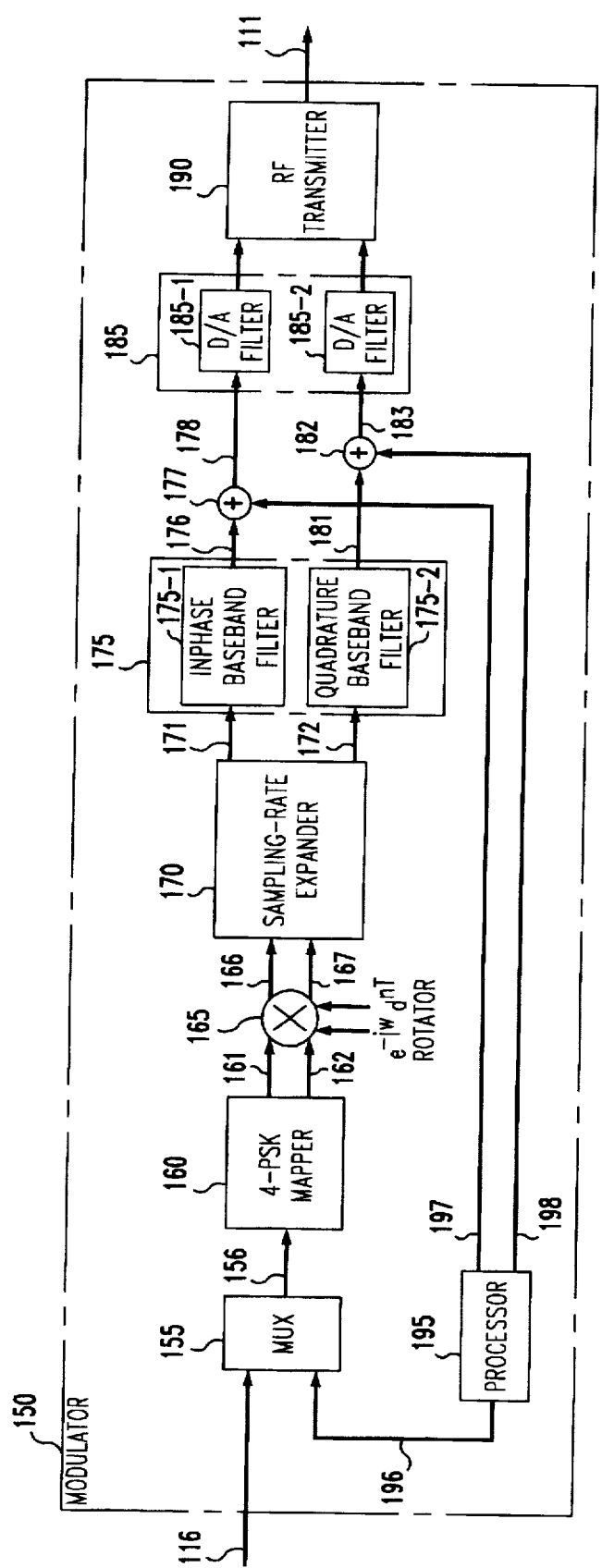
FIG. 2 shows a more detailed block diagram of a portion of transmitter 100 of FIG. 1.

Turning now to FIG. 2, a block diagram of modulator 150 is shown. Encoded signal 116 is applied to multiplexer (MUX) 155, which multiplexes encoded signal 116 with synchronization (sync) data 196 to develop aggregated data signal 156. Sync data 196 is a 20 kb/s (10k symbols/sec) data stream that represents synchronization, and equalization information (described further below) generated by processor 195. The latter is representative of a digital signal processor. (It should be noted that although the invention is illustrated herein as being implemented with discrete finctional building blocks, e.g., 4-PSK mapper 160, etc., the functions of any one or more of those building blocks can be carried out using one or more appropriate programmed processors, as represented by processor 195.) Aggregated data signal 156 represents a 360 kb/s data stream that is formatted into a sequence of frames, where each frame is 10 milli-seconds (ms) in width and is divided into two portions: a header portion and an encoded data portion. In every 10 ms period, the header portion represents 200 bits (100 symbols) of synchronization data, while the encoded data portion represents 3400 bits of encoded signal 116.

Figure 3:
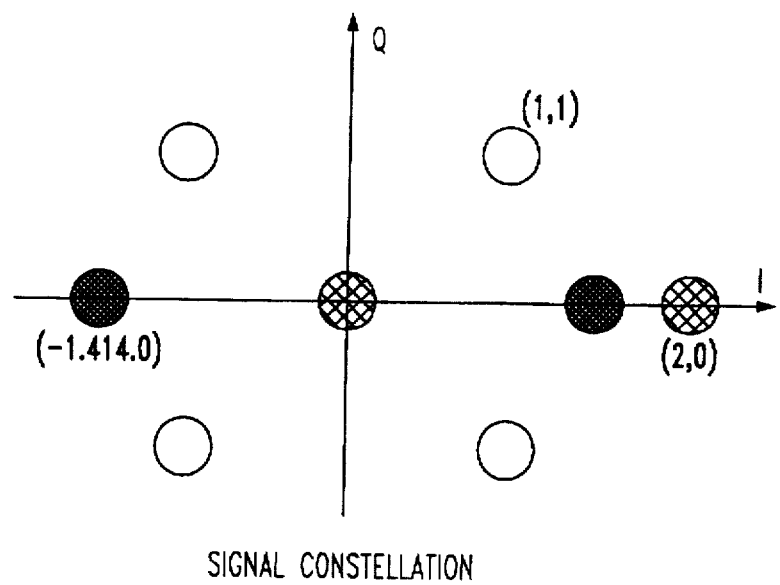
FIG. 3 shows an illustrative signal point constellation for use in transmitter 100 of FIG. 1.

The aggregated data signal 156 is applied to 4-phase-shift keying (PSK) mapper 160, which maps two bits at-a-time into a two-dimensional complex symbol having in-phase and quadrature components, 161 and 162, respectively. Each symbol can be equivalently represented by {a(n)+jb(n)}. An illustrative signal point constellation is shown in FIG. 3. As can be observed from FIG. 3, the signal point constellation comprises four "data symbols," two "channel sync and sounding symbols," and two "interleaver (symbol clock) sync symbols." It can be observed from the signal constellation of FIG. 3 that the "channel sync and sounding symbols" and the "interleaver (symbol clock) sync symbols" are one-dimensional symbols having only in-phase values. The resulting output signal from 4-PSK mapper 160 is a sequence of frames, each frame comprising 1800 complex symbols for every frame.

Figure 4:
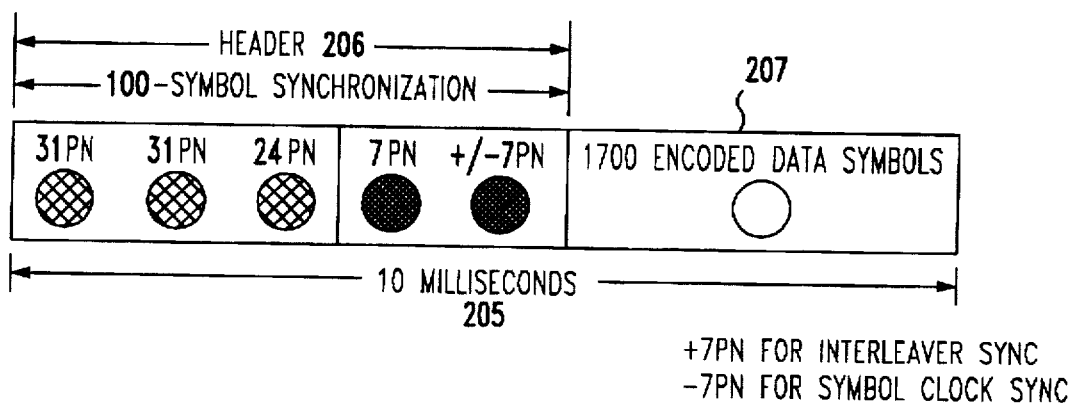
FIG. 4 shows an illustrative frame format for use in transmitter 100 of FIG. 1.

An illustrative frame 205 is shown in FIG. 4. As described above, frame 205 is 10 milli-seconds (ms) in width and is divided into two portions: a header portion 206 comprising 100 complex symbols that are restricted to being one-dimensional, and an encoded data portion 207 comprising 1700 complex symbols.

For the encoded data portion of the aggregated data stream, the four data symbols from the signal point constellation of FIG. 3 are used. The data symbol mapping is performed according to the following rules, where each bracket contains two paired elements, the incoming bits and their associated symbol specified by the relative in-phase and quadrature signal strengths in the illustrative constellation of FIG. 3: {(0,0), (−1,−1)}, {(0,1), (−1,1)}, {(1,0), (1,−1), (1,1)}.

With respect to the header portion of each frame, the 100 complex symbols represent a synchronization signal. These 100 complex symbols are purposely designed to be one-dimensional and only have values in the in-phase component as shown in the signal point constellation of FIG. 3. Among the 100 synchronization symbols of header 206 are 86 one-dimensional symbols used to assist frame synchronization at receiver 300. These 86 one-dimensional symbols are selected from the "channel sync and sounding symbols" of the signal point constellation of FIG. 3 and comprise two "31 symbol pseudo-random number" (31PN) sequences followed by a 24PN sequence (a segment of a 31PN sequence). (The generation of a pseudo-random number sequence is known in the art). These 86 symbols are also used at receiver 300 for channel sounding and equalization purposes, including multi-path correction, timing phase recovery, and carrier phase recovery (described below).

The remaining 14 one-dimensional symbols of header 206 are used for either interleaver synchronization or symbol clock alignment in receiver 300. These 14 one-dimensional symbols are selected from the "interleaver (symbol clock) sync symbols" of the signal point constellation of FIG. 3. In particular, the 14 symbols are used by receiver 300 to indicate the beginning of each 320 ms interleaver block. This interleaver synchronization is repeated every 32 frames and comprise two consecutive 7PN sequences as shown in FIG. 4.

In any event, the 14 symbols are always used for data symbol synchronization in the associated frame. When used for also providing interleaver synchronization, the 14 symbols comprise two positive 7PNs. Otherwise, the 14 symbols comprise one positive 7PN followed by a negative 7PN as shown in FIG. 4. This is needed to align the encoded data portion of each frame whenever there is a significant sample time phase change or the relative strength of different signal paths changes and causes a change in the delay seen by receiver 300. (It should be noted that in this context, a negative PN sequence is simply the opposite of a positive PN sequence. For example, if a 2PN was represented by the symbols (1.414,0; −1.414,0) shown in FIG. 3, the corresponding negative 2PN is the symbol sequence (−1.414,0; 1.414,0).

Returning to FIG. 2, in-phase and quadrature components 161 and 162 are applied to rotator 165, which rotates the phase of each symbol. In particular, each rotated symbol is expressed as follows:

$$A'(n)=a'(n)+jb'(n)=A(n)e^{-j\omega_d nT}=[a(n)+jb(n)]e^{-j\omega_d nT} \quad (1)$$

where $\omega_d=2\pi \times 150,000$ is the rotation frequency, and n denotes the time index of symbol instances spaced by T.

The output symbol stream of rotator 165 is sampled by sampling-rate expander 170 at three times the symbol rate of 1/T. The sampling rate of rotated symbols are expanded by inserting two zero-valued samples between all symbols.

As a result, the complex rotated symbols are expanded by a factor of L and sampling-rate expander 170 provides an expanded complex symbol stream defined as A"(m):

$$A''(m)=A'(k/L) \text{ for } k=0,\pm L,\pm 2L,\pm 3L, \ldots, \text{ and 0 otherwise,} \quad (2)$$

where, m is the time index of samples spaced by T', and L=(T/T')=3 is the oversampling factor.

The expanded complex samples are then spectrally shaped by digital baseband filter 175, which comprises identical inband baseband filter 175-1 and quadrature baseband filter 175-2. (Although, in theory, rotated in-phase and quadrature symbols can be converted to analog signals and respectively filtered by analog filters, it is much more difficult to control the specification of analog filters than their digital counterpart.) Digital baseband filter 175 has a transfer function defined as $h_b(m)$, which only has real values. For illustration purposes, digital baseband filter 175 has a 10% excessive bandwidth utilizing a 66-tap (22-symbol span) finite impulse response (FIR) filter. It should be noted that a hardware implementation of digital baseband filter 175 can take advantage of the fact that in the expanded samples there are two zero-valued samples in each symbol interval. As a result, this filtering operation can be viewed as having three sub-filters (not shown), $h_b(3r)$, $h_b(3r-1)$, $h_b(3r-2)$, with the same set of symbols, A'(r), at their input, where r is a time index at the symbol interval and r=k/L. These three sub-filters, each individually producing a sample in a cyclical fashion, yield three output samples in every symbol interval indexed by r. Although not necessary to the inventive concept, the use of this sub-filter structure reduces the computation complexity by a factor L compared to a brute force implementation of digital baseband filter 175.

The complex output of digital baseband filter 175 is:

$$y(m) = \sum_{k=-\infty}^{\infty} h_b(m-k)A''(k), \text{ or} \tag{3a}$$

$$y(m) = \sum_{r=-\infty}^{\infty} h_b(m-Lr)A'(r). \tag{3b}$$

To the output samples, y(m), of digital baseband filter 175 is added a pilot signal, which is digitally generated by processor 195. The pilot signal is a complex signal expressed as $\kappa e^{j\omega_p mT'}$, which is also at three times the symbol rate by adding a sampled version of a 100 Khz cosine waveform to the filtered in-phase samples and that of a sine-waveform to the filtered quadrature samples. The additional power that the pilot tone adds to the signal provided by digital baseband filter 175 is about 0.3 dB.

The complex-valued signal provided by adders 177 and 182 is:

$$s(m) = y(m) + \kappa e^{j\omega_p mT'}. \tag{4}$$

where $\kappa$ determines the pilot power. Alternatively, the in-phase component and the quadrature component, the real and the imaginary part of the above equation, can be expressed as:

$$s_i(m) = \left[ \sum_{r=-\infty}^{\infty} [a(r)\cos(\omega_d rT) + b(r)\sin(\omega_d rT)]h_b(m-rL) \right] + \kappa\cos(\omega_p mT'), \tag{5a}$$

$$s_q(m) = \left[ \sum_{r=-\infty}^{\infty} [b(r)\cos(\omega_d rT) - a(r)\sin(\omega_d rT)]h_b(m-rL) \right] + \kappa\sin(\omega_p mT'), \tag{5b}$$

where equation (9a) is representative of signal 178 and equation (9b) is representative of signal 183.

The signal, s(m), is then applied to digital-to-analog (D/A) filter 185, comprising in-phase D/A filter 185-1 and quadrature phase D/A filter 185-2. It is assumed that each D/A filter comprises a "sample-and-hold" circuit (not shown) followed by a low-pass analog filter (not shown).

The resulting analog signal from the sample-and-hold circuits is denoted as:

$$s_c(t) = \sum_{m=-\infty}^{\infty} s(m)\Pi(t-mT'), \tag{6}$$

where, $\Pi(t)$, is a rectangular pulse that is introduced by the sample-and-hold circuits of D/A filter 185 and is defined as follows:

$$\Pi\left(\frac{t}{T'}\right) = 1, |t| < \frac{T'}{2}, \text{ and 0 otherwise.} \tag{7}$$

Its Fourier transform is a sinc function expressed as:

$$F\left[\Pi\left(\frac{t}{T'}\right)\right] = T' \frac{\sin(\pi fT')}{\pi fT'}. \tag{8}$$

Now, it can be observed that the use of a higher oversampling rate 1/T' reduces the spectral shaping effect due to the sample and hold circuits. It also increases the separation between aliases. The D/A converter output signal, with alias repeating in every 1/T', is then filtered by the analog low-pass filter (not shown) of D/A filter 185. Usually, in designing an analog filter, a significant envelope delay distortion occurs in the narrow pass-band to stop-band transition region. However, here the aliasing is separated by a large frequency span, so that the analog filter stop-band can be moved from the critical signal spectrum and therefore would not cause significant distortion in the signal.

The signal $s_c(t)$ is then up-converted to an IF signal, e.g., 10.7 MHz, followed by further conversion to an RF signal by RF transmitter 190 as known in the art. (In the context of this invention, it is assumed that the RF signal is within one of the predesignated frequency channels associated with FM radio. Furthermore, we can also use other frequencies that could be allocated for this service.) The transmitted signal at this point can be expressed as:

$$s(t) = Re\left[ \left( \sum_n A_n e^{-j\omega_d nT}h_b(t-nT) + \kappa e^{j\omega_p t} \right) e^{j\omega_c t} \right], \tag{9}$$

where $\omega_p = 2\pi(100,000)$, and $\omega_d = 2\pi(150,000)$, and $\omega_c$ is the RF carrier frequency.

Before turning to the receiver section, the reason behind the rotation of symbols in the transmitter will be explained.

As shown in (9), the symbol $A_n$ is rotated by $e^{-j\omega_d nT}$ in the transmitter. Assuming that the channel and modulation are ideal, this low IF signal can be expressed using the above equation (9) by setting $\omega_c = \omega_d$. As described further below, circuitry in receiver 300 then yields a low IF signal centered at 150 Khz, $\omega_d$, instead of yielding a more typical baseband signal. This, excluding the pilot, yields:

$$r(t) = Re\left[ \sum_n A_n e^{-j\omega_d nT}h_b(t-nT)e^{j\omega_d t} \right] = Re\left[ \sum_n A_n h_b(t-nT)e^{j\omega_d(t-nT)} \right], \text{ or} \tag{10a}$$

$$r(t) = Re\left[ \sum_n A_n h_b(t-nT) \right], \tag{10b}$$

where $h_p(t)$ is a pass-band channel and $h_p(t)=h_b(t)e^{j\omega_d t}$. If a Hilbert filter pair is used within receiver 300, it yields an analytical signal:

$$z(t) = \sum_n A_n h_p(t - nT). \qquad (11)$$

Assuming that $h_b(t)$ satisfies the Nyquist criterion, $z(t)$ can be sampled at symbol intervals to recover baseband symbols $A_n$. This can be understood from the basic sampling theory which teaches that the received spectrum after sampling is repeated at every $1/T$. Therefore, the sampling process reconstructs the original $A_n$. This is shown in the following equations.

$$z(t) = \sum_n (a_n + jb_n) h_b(t - nT)(\cos\omega_d(t - nT) + j\sin\omega_d(t - nT)) \qquad (12)$$

We use the inphase component as an example.

$$Re[z(t)] = \sum_n a_n h_b(t - nT)\cos\omega_d(t - nT) - b_n h_b(t - nT)\sin\omega_d(t - nT) \qquad (13a)$$

at $t = kT$ (13b)

$$Re[z(kT)] = \sum_n a_n h_b((k - n)T)\cos\omega_d((k - n)T) - b_n h_b((k - n)T)\sin\omega_d((k - n)T) \qquad (14a)$$

therefore $Re[z(kT)] = a_k$ (14b)

since $$h_b((k - n)T)\cos\omega_d((k - n)T) = \begin{cases} 1, & \text{for } n = k \\ 0, & \text{for } n \neq k \end{cases} \qquad (15a)$$

$$h_b((k - n)T)\sin\omega_d((k - n)T) = 0 \text{ for all } k - n \qquad (15b)$$

However, if $s(t)$ were not rotated by $e^{-j\omega_d nT}$ at the transmitter, the result in (14b) and its associated quadrature component would be rotated by $e^{-j\omega_d nT}$ and therefore, a rotator would be needed at the receiver to compensate for this rotation. In addition to this, this receiver rotator would need to compensate for any phase shifts due to Doppler effects, etc. While simple in concept, this leads to a complex implementation of the receiver rotator since it must track both changes in phase at $\omega_d/2\pi$ Hz and the above-mentioned phase shifts. For example, a larger step size may be needed in the concomitant control loop to track these phase changes. As a result, acquisition time and resulting noise components increase. Therefore, and in accordance with the invention, the rotator is placed in the transmitter as shown in FIG. 2 to simply the receiver implementation. In particular, the use of rotator 165 removes phase ambiguity and simplifies tracking in receiver 300 of the received RF signal. Tracking is simplified since a low-order, e.g., first-order, digital carrier phase recovery circuit can now be used in the receiver to quickly track any residual frequency/phase changes in the received signal after the RF section. This ability to quickly acquire the received RF signal is especially important when the receiver is located in a moving car and subject to the above-mentioned Doppler effects.

More importantly, by using rotation in the transmitter, a simplified coherent carrier frequency (or phase) compensation is made possible without further system design constraints such as the choice of the data block size. As a result of transmitter rotation, the modulation provided by modulator 150 is referred to herein as a carrierless QPSK modulation, as opposed to the nominal QPSK modulation.

It should be noted that one problem with the baseband approach described above is that the radio up-conversion requires cosine and sine modulators. It is not trivial to maintain the two analog radio modulators exactly separated by 90 degrees. If the two modulators are not precisely aligned in phase, the two signals do not form a perfect Hilbert pair (as known in the art) or analytic complex function. There are other approaches such as a digital pass-band implementation to avoid this problem. In the passband approach, baseband digital filters are replaced by inphase and quadrature passband filters, which form a Hilbert pair. The inphase passband filter output is subtracted from the quadrature filter output. The resulting signal is then modulated to an intermediate frequency where a selective analog bandpass filter is used to reject the associated image. The bandpass filtered signal is then converted to the radio frequency for broadcasting to the air. This scheme simplifies the need of using two well balanced (90 degrees apart) mixers at the expense of a more selective image reject bandpass filter. (Deviation of phase difference of the two mixers from 90 degrees results in performance degradation.)

To relax the selectivity requirement of this image rejection bandpass filter, the center frequency of the inphase/quadrature digital passband filters can be set at a higher frequency which implies the use of a higher over-sampling rate, L. Finally, the rotating frequency of the phase rotator before the digital filters should be properly chosen such that the baseband and passband implementations are equivalent. If the center frequency of the passband filters is set at 150+180N+X kHz, the rotation frequency should be set at −X kHz (where N is an integer $\geq 0$ and 180 kHz is the symbol rate). Overall, the above-described baseband approach may result in a small performance penalty given the implementation of receiver 300, which will now be described. Also, note the pilot in the passband case should be offset from the passband center frequency.

Figure 5:
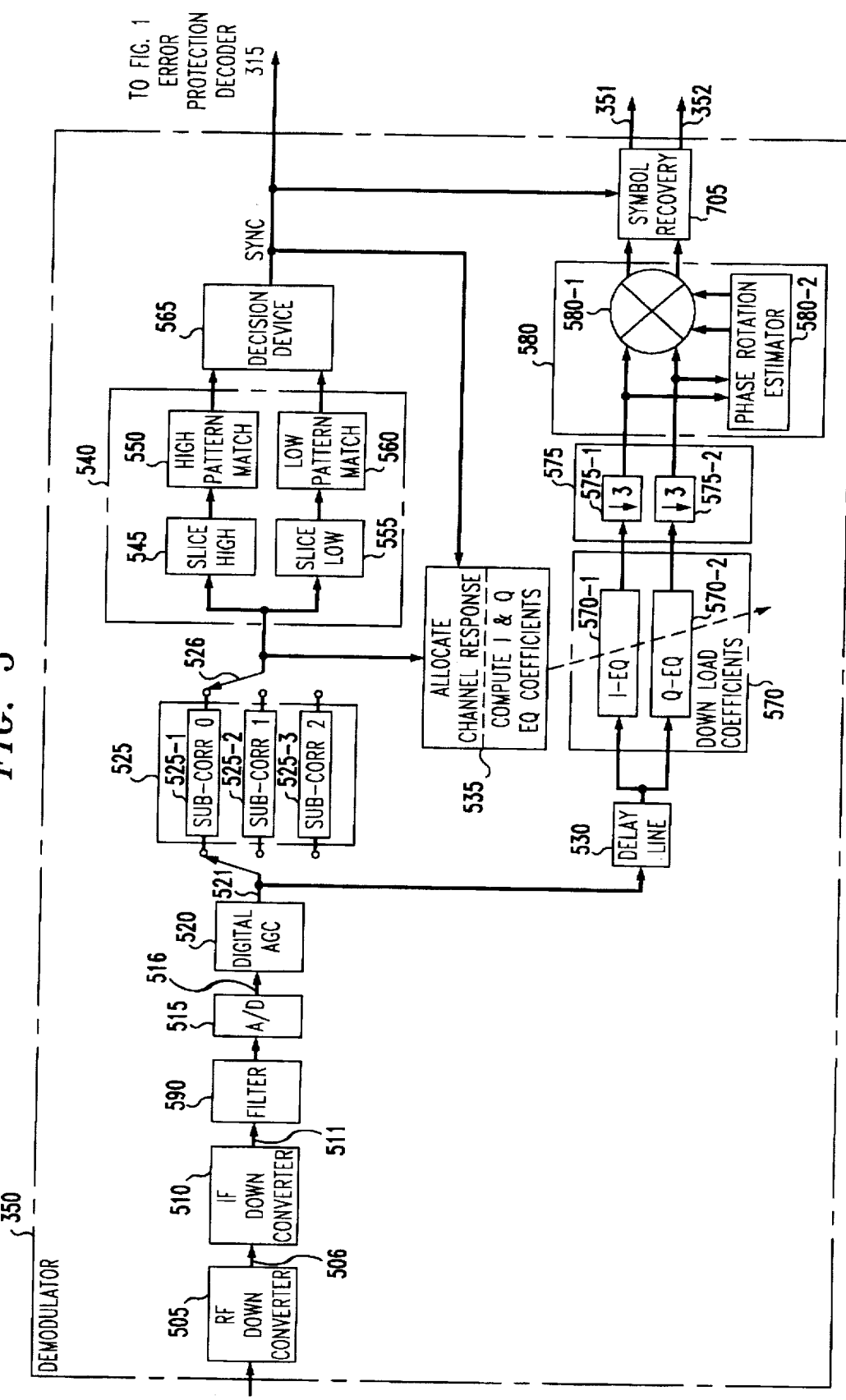
FIG. 5 shows an illustrative block diagram of a portion of receiver 300 of FIG. 1.
Figure 6:
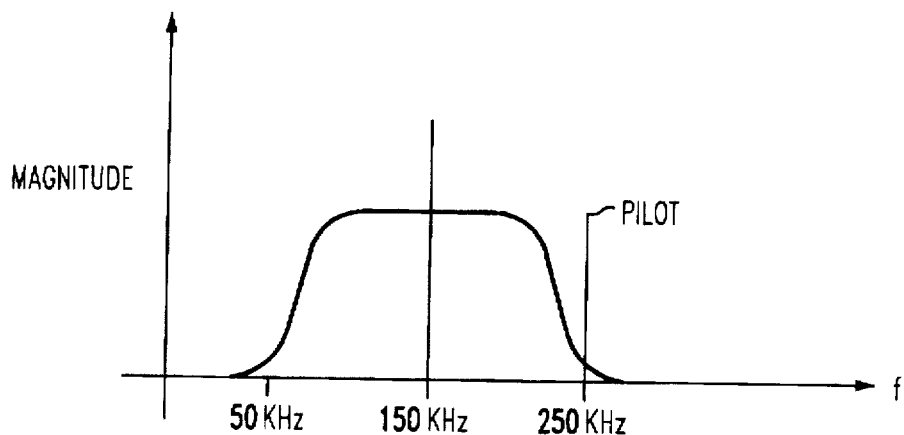
FIG. 6 shows an illustrative frequency spectrum for a low IF signal generated within receiver 300 of FIG. 1.

In receiver 300, a received RF signal is applied to demodulator 350, which is shown in block diagram form in FIG. 5. Demodulator 350 comprises RF-down-converter 505 which is an "IF filter" that down converts the received RF signal to an IF frequency, e.g., 10.7 MHz, as is known in the art. The resulting IF output signal is then applied to IF-down-converter 510, which provides a pass-band low IF signal 511 centered at 150 Khz that includes the above-described pilot signal at 250 Khz, which is used in receiver 300 as a reference for carrier recovery and as a source to generating other clock signals for the receiver (described below). An illustrative spectrum of the magnitude of the passband low IF signal 511 is shown in FIG. 6.

Figure 7:
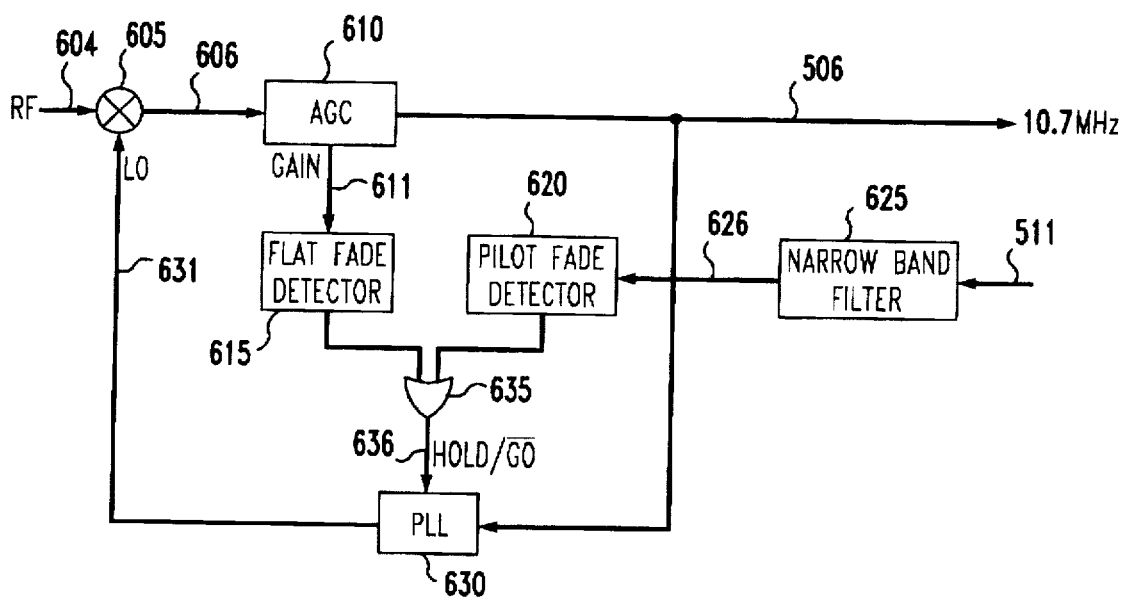
FIG. 7 shows an illustrative block diagram of a phase-lock-loop circuit responsive to flat fades and frequency fades.

Before proceeding with a discussion of the remainder of demodulator 350, it should be noted that to compensate for any carrier frequency difference between the transmitted RF signal and the received RF signal, an analog carrier phase-lock-loop (PLL) is usually included within RF down converter 505. (Although the analog carrier PLL could be implemented in other parts of demodulator 350, it is best to implement this function in the RF section.) However, in this type of mobile environment, the received RF signal may be subject both to frequency-selective fades and amplitude fades (herein referred to as "flat fades"). Therefore, the PLL circuitry of RF down converter 505 is modified as illustrated in FIG. 7 to be responsive to both a flat fade or a frequency-selective fade.

In particular, a received RF signal is applied to mixer 605, which also receives a local oscillator signal (LO signal) 631. It is assumed for simplicity that mixer 605 includes all required circuitry to provide a recovered IF signal 606 illustratively at 10.7 MHz as is known in the art. This recovered IF signal is applied to automatic gain control 610, which is used to adjust the amplitude of the recovered IF signal to provide the above-mentioned IF output signal 506. Analog PLL 630 is a phase lock loop and is assumed to include a crystal to generate the required LO signal 631. As known in the art, analog PLL 630 adjusts the phase of the LO signal in response to an IF signal, here represented by IF output signal 506. However, analog PLL 630 is operated in either a tracking mode or a lock mode depending on the state of the "Hold/Go" signal 636. If the latter is representative of a logical "ONE," analog PLL 630 stops tracking and locks the phase of LO signal 631. On the other hand, if "Hold/Go" signal 636 is representative of a logical "ZERO," then analog PLL 630 continues to adjust the phase of LO signal 631. In other words, the feedback loop of analog PLL 630 is held open to avoid misadjustment when there is a severe flat fade or a frequency-selective fade at the pilot frequency.

In particular, a flat fade of the received RF signal is detected by flat fade detector 615 which compares an output signal from AGC 610 that is representative of the amplitude of recovered IF signal 606. When the amplitude of recovered IF signal 606 is lower than a predetermined value such as −110 dBm, flat fade detector 615 applies a logical "ONE" to OR gate 635. The latter applies a logical "ONE" signal to analog PLL 630, which inhibits tracking. Similarly, pilot fade detector 620 is used to detect a frequency-selective fade around 250 Khz. The above-mentioned low-level IF signal 511 is applied to narrowband filter 625, which is centered at the pilot signal frequency, e.g., 250 Khz. Narrowband filter 625 provides recovered pilot signal 626 to pilot fade detector 620. The latter compares recovered pilot signal 626 against a reference threshold. As long as pilot fade detector 620 detects a recovered pilot signal 626, it is assumed that there is no frequency fade and pilot fade detector 620 provides a logical "ZERO" to OR gate 635. However, whenever pilot fade detector 620 does not detect recovered pilot signal 626, pilot fade detector 620 applies a logical "ONE" to OR gate 635, which then inhibits analog PLL 630 from adjusting the phase of LO signal 631. It should be noted that the recovered pilot signal could be generated by other methods, e.g., by using the equalizer or channel characterization arrangement described below. However, if other approaches are taken, those in the art should be cognizant of any significant processing (time) delays in generating the recovered pilot signal. It is also possible to have the flat fade detector and pilot fade detector generate their outputs according to the quality of the pilot rather than a logical "one" or "zero". For example, the flat fade detector can produce an output that is proportional to the difference between the received signal and a predetermined value such as −110 dBm, for adjusting the PLL loop bandwidth. In the extreme case, the PLL is in the "hold" state by reducing the loop bandwidth to zero (open the loop). Yet another alternative could be to use different weighting coefficients as a function of the input signal level instead of just a binary one and zero. A decision whether to "hold" or "go" is based on comparing the threshold value to a value calculated instantaneously, or cumulatively over a predefined time interval, using the weighting coefficients.

Returning to FIG. 5, as described above, IF down converter 510 yields a low IF signal 511 centered at 150 Khz, $\omega_d$, instead of yielding a more typical baseband signal. As noted above, FIG. 6 shows an illustrative frequency spectrum for low IF signal 511, which occupies the frequency range from 50 Khz to 250 Khz. The generation of low IF signal 511—as opposed to a more typical based band signal—is chosen in recognition of the fact that any upper adjacent RF channel interference rejection can be further enhanced by an analog or digital low-pass filter, while any lower adjacent RF channel interference must be reduced solely by an IF filter. However, a highly selective filter is more difficult to design at the IF frequencies. Indeed, lower adjacent RF channel interference, after passing through a typical RF-down-converter, aliases into the main signal through the final IF frequency conversion. However, to reduce this aliasing, a pass-band low IF signal is generated such that the low IF signal 511 sits between 50 and 250 Khz with a "free" region from 0 to 50 Hz. This free region guarantees that the first 50 Khz of the remaining lower adjacent RF channel interference would not alias into the main signal. In other words, if the low IF signal 511 had been set at 100 Khz and allowed no free region, the 10.7 MHz IF signal would have to be designed such that the stop-band attenuation at 10.6 MHz is as much as that of the former case at 10.55 MHz. However, the choice of the low IF signal 511 centered at 150 Khz relaxes the 10.7 MHz IF filter stop-band attenuation requirement. Also, notice that while in traditional RF design it is important that RF-down-converter 505 does not introduce ripples and envelop delay distortion in the band of interest, that requirement can be relaxed in the implementation of FIG. 5 since a digital system with an equalizer follows (described below). In fact, any IF filter imperfection can be compensated for by the receiver's equalizer at a minimal cost of noise enhancement if there is any. However, it is important that the signal power be adjusted before the IF filter and thus any internal system noise after is negligible. In fact, the IF filter response can be biased toward the lower frequency to obtain more stop-band attenuation to the lower adjacent channel interference.

Low IF signal 511 is applied to filter 590 which is designed to include both a baseband analog low-pass filter and a high pass filter in series. The low pass filter (not shown) is designed with a significant stop-band attenuation between 250 and 270 Khz to further reject the upper adjacent channel interference. This baseband analog low-pass filter avoids aliasing in the sampling process caused by possible insufficient 10.7 MHz IF filter rejection. The high-pass filter (not shown) is designed to further reduce the lower adjacent channel interference that can adversely affect the synchronization detection. (Note that it does not eliminate the lower adjacent channel interference that has already been aliased into the main signal, due to the insufficient rejection in RF frequency conversions.)

The low IF output signal from filter 590 is sampled by analog-to-digital (A/D) converter 515 at three times the symbol rate, here illustratively 540 Khz (the Nyquist frequency is at 270 Khz). The stream of digital samples 516 from A/D converter 515 is applied to digital gain control (DGC) 520, which develops a stream of received digital samples 521. The latter is applied to correlator 525 and delay line (or buffer) 530.

Delay line 530 is designed to take into account the processing delay to process the channel impulse, the equalizer coefficient calculation and the delay that is need to implement the mid amble equalization (all of which is described below).

In a conventional receiver design, a Hilbert filter pair is used to generate in-phase and quadrature signal components, and a complex (cross-coupled) equalizer is used to recover the transmitted baseband signal. The complex (cross-coupled) equalizer comprises four filters arranged such that the in-phase and quadrature output signals are each generated by two filters. For example, the in-phase output signal is the result of a first filter processing the in-phase input signal and a second filter processing the quadrature input signal. The quadrature output signal is similarly constructed with a different filter pair. Despite this obvious suggestion, the above-mentioned generation of a pass-band low IF signal—as opposed to a more conventional baseband signal—allows the use of non-cross-coupled equalizer 570.

Equalizer 570 is composed of two filters, one for in-phase (I-EQ 570-1) and the other for quadrature (Q-EQ 570-2). Both of these filters have a common input signal at a 3/T rate, referred to herein as fractionally-spaced samples. Each filter produces recovered in-phase and quadrature output signals at a 1/T rate from samplers 575-1 and 575-2, respectively. Although not described herein, it can be mathematically shown that non-crossed-coupled equalizer 570 not only recovers a two-dimensional signal but also forms a Hilbert-pair. This result is important in order to design both in-phase and quadrature equalizer coefficients from the in-phase-only channel sounding signal (described below). It should be noted that equalizer hardware complexity is reduced by using a 3/T non-cross-coupled equalizer compared to that of the above-mentioned 2/T cross-coupled equalizer. For example, although equalizer 570 operates at a 3/T sampling rate, only two filters are needed. This is a savings of 25% in equalizer hardware compared to the 2/T cross-coupled four filter equalizer, in addition to the savings in a Hilbert filter pair needed in front of the cross-coupled equalizer.

The in-phase and quadrature output signals (which are streams of digital samples at the symbol rate 1/T) are applied to carrier recovery loop 580, which compensates for any phase offset, $\phi_k$, in the received signal. As described above, since a rotator is present in transmitter 100 to compensate for the pass-band generation of low IF signal 511, a low-order phase lock loop can be used in receiver 300 (as described earlier) to quickly track any frequency/phase changes in the received RF signal. This ability to quickly acquire the received RF signal is especially important when the receiver is located in a moving car and subject to the above-mentioned Doppler effects.

However, in this illustrative embodiment, the carrier recovery loop is represented by digital carrier recovery loop 580, which comprises phase rotation estimator 580-2 and phase rotator 580-1. For illustration purposes, it is assumed that phase rotation estimator 580-2 is implemented in a digital signal processor (DSP) (not shown). The DSP measures the angle difference between the equalizer output and its ideal position and feeds this information back to phase rotator 580-1 for counter-rotating the angle difference. The phase difference is obtained by averaging over 32 symbols and using the resulting calculation for the following 300 symbols. As a result, only six estimates are performed over an entire frame, or data block (as illustrated by frame 205 of FIG. 4). This is a block-based feed-forward correction procedure instead of a typical phase-lock loop feedback implementation where the error is taken from the difference between the rotator output and the sliced position is filtered and used to drive a phase-lock circuit to give the estimate. This feed-forward correction procedure is simple and agile in tracking especially for a fast moving vehicle. However, its frequency off-set tracking range is very limited, e.g., on the order of only ±18 Hz. Furthermore, the carrier phase change in every 300 symbols can be significant enough to cause degradation. It should be noted that the implementation of a symbol-based second-order phase-lock-loop or an additional frequency tracking loop in the carrier recovery loop system could further improve tracking.

Before proceeding further with a description of the processing of the phase-corrected symbol stream provided by digital carrier recovery loop 580, attention is now directed to correlator 525, pattern matcher 540, decision device 565, and channel response element 535. These elements provide the functions of frame synchronization and channel characterization.

With respect to frame synchronization, a synchronization detection algorithm is generally designed to match a predetermined signal pattern (also referred to as the training signal) at the receiver to the incoming signal. If there is a match, synchronization is declared. The devices used to produce the information in determining whether or not there is a match is called a correlator. A counter at the output of the correlator is increased or decreased according to whether or not a particular symbol in the synchronization signal is matched. The outcome of the counter indicates the similarity between the incoming signal and the stored signal pattern at the receiver. Such a counter is referred to as a confidence counter. Such a simple synchronization mechanism only uses very limited information available from a correlator. The regular data signal, unless constrained, may have a pattern similar to the synchronization signal and can cause a false detection.

However, I have realized that a synchronization detection device can be improved if the synchronization signal is designed in such a way that the correlator, when matching to the synchronization signal, yields distinctive signal characteristics that can be used to differentiate the synchronization signal from the data signal in a noisy environment. In this case, a particular training signal with a certain property is needed. It is also desirable that the information obtained in the synchronization process from this particular training signal be used to determine channel characteristics (channel sounding).

Therefore, a synchronization pattern with distinctive properties in its autocorrelation function is used to improve the synchronization reliability. Illustratively, this is a reason for the use of a binary pseudo-random sequence in header 206. When such a sequence is repeated at the transmitter and correlated at the receiver with a copy of the non-repeated pattern, the correlator produces a high value (peak) when there is a match and low values (quiet zone) otherwise. Since the sequence is repeated, information known a priori about the periodicity and the width of the peaks and quiet zones can be used to enhance detection reliability.

When such a sequence of length N with symbols assuming values, 1 and 0, is repeated at the transmitter and correlated by a stored copy of the sequence with values 1, and −1 (−1 substitutes for 0) at the receiver, the correlator output yields a high peak of amplitude (N+1)/2 when the sequence is matched and a low value otherwise. It is also possible to use sequences of 1 and −1 values at the transmitter and correlate with a stored copy of a sequence of 1 and 0 values. The received signal can be hard-sliced to a 1 or a 0 for simple processing. However, this method, alone, is not robust in the case of a severe channel distortion, such as in a mobile environment. Therefore, as described below, it is assumed that any correlator input retains full precision given by the A/D converter. That is, the correlator output signal is representative of real numbers and not limited to a simple logical 1 or 0.

Turning back to FIG. 5, the stream of received digital samples 521 is applied to correlator 525. The latter is implemented using a sub-correlator structure. Examples of sub-correlator structures can be found in U.S. Pat. No. 5,260,972, entitled "Technique for Determining Signal Dispersion Characteristics in Communications Systems," issued Nov. 9, 1993 to Wang; and U.S. Pat. No. 5,406,586, entitled "Signal Correlation Technique," issued Apr. 11, 1995 to Wang. It should be noted that if the synchronization symbols are no longer constrained to one-dimensional, additional sets of correlators are required.

Figure 8:
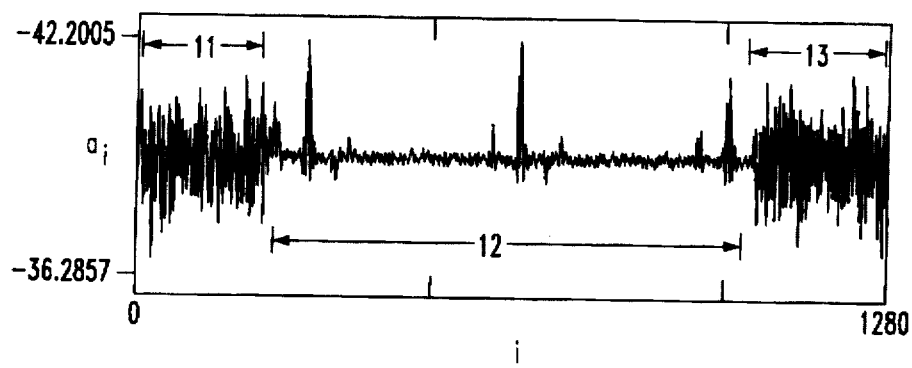
FIG. 8 shows an illustrative graph of correlator output signal 526.

The synchronization process is designed to detect the beginning of each 10 ms data block composed of two consecutive 31PN sequences followed by a partial 24PN segment (the above-mentioned 86 symbols of header 206). Using a copy of the 31PN sequence as its coefficients and receiving an input signal with full precision, correlator 525 produces a correlator output signal 526. One example of correlator output signal 526 is shown in FIG. 8, which illustrates correlator output signal 526 while receiving header 206 of a frame. For example, region 11 corresponds to the tail-end of the data portion of the previous frame, region 12 generally corresponds to header 206 of the current frame, and region 13 corresponds to the beginning of the data portion of the current frame. (The two 7PN synchronization symbols remaining in header 206 are equalized and used to synchronize the de-interleaver and to adjust the symbol location in each received data block, described below).

Correlator output signal 526 is applied to confidence counter 540, which comprises the following circuitry: slice high 545, slice low 555, high pattern match 550, and low pattern match 560. Slice high circuitry 545 slices the correlator output signal 526 to provide a 1 or 0 depending on whether or not its absolute value exceeds a predetermined high threshold. Similarly, slice low circuitry 55 slices the correlator output signal 526 to provide a 1 or 0 depending on whether or not its absolute value is lower than a predetermined low threshold. It is also possible to represent the just mentioned one or zero with real numbers to reflect the quality of the signal when compared to high or low threshold. These two sliced outputs are then applied to high pattern match circuitry 550 and low pattern match circuitry 560, respectively. High pattern match circuitry 550 and low pattern match circuitry 560 are also referred to herein as the secondary correlators. The latter produce information to indicate how similar is the input signal autocorrelation compared to that of the pre-stored signal. The information from high and low secondary correlators is then weighted and summed for synchronization decision making by decision device 565, which provides a synchronization signal (sync).

It should be noted that a correlator having a hard-sliced input has well defined peaks and quiet zones at the output—if the sliced input is correct. As noted above, it is assumed that in the presence of channel impairments, a correlator accepting a full precision is used. The output of a full-precision correlator is the convolution of that response of a hard-sliced correlator and the channel impulse response. Since the received signal is bandlimited and distorted by multipath, quiet zones would not exist if the channel span is longer than the length of the transmitted PN sequence. Therefore, to avoid the quiet zone being completely corrupted, a 31-symbol PN sequence is used because the 31PN sequence is much longer than the worst case channel span. This ensures that there will be areas in the correlator output that are quiet and can be used for reliable synchronization detection. A high (peak) threshold pattern is used to detect periodic peaks separated by 31 symbols. The width of each peak detection zone in the high threshold pattern is L samples, where typically L=3, or one symbol. A low threshold pattern is used to detect periodic quiet zones. The width of each quiet zone detection is N samples, typically 18 or six symbols. The region where there may be a response caused by multipath is defines as the "ignoring zone." Its contribution is set to zero by setting the associated coefficients in the secondary correlators to zero values.

(It should be noted that in region 12 of FIG. 8, the first expected peak from the first 31PN sequence is, to an extent, correlated with data from the end of the previous frame. However, the second received 31PN sequence, absent corruption, has clear peak and quiet zones, since the second 31PN sequence is correlated with, theoretically, the first 31PN sequence. The final PN sequence may have less of a peak since it is only a 24PN sequence).

Figure 9:
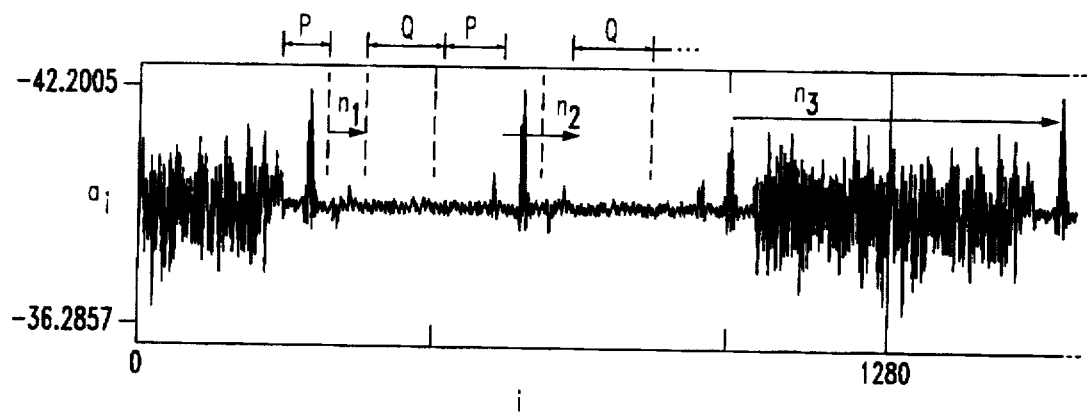
FIG. 9 illustrates peak, ignoring, and quiet zones in the correlator output signal of FIG. 8.
Figure 10:
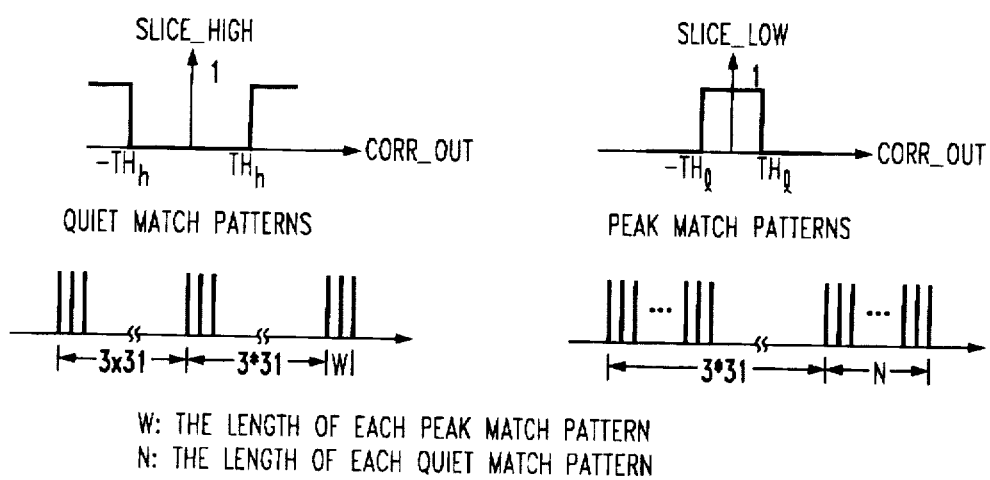
FIG. 10 illustrates the concepts of a peak match pattern and a quiet match pattern.

This is illustrated in FIG. 9, which is identical to FIG. 8 except for the illustrative labeling of a "peak detection zone" (P), "ignoring detection zone" (I), and "quiet detection zone" (Q). During the peak detection zone, a peak match pattern is sought. After the peak detection zone, the correlator output is ignored for a period of time as represented by the ignoring detection zone (also shown as $n_j$). After the latter, a quiet match pattern is sought during the quiet detection zone. Illustrative peak match and quiet match patterns are shown in FIG. 10.

Figure 12:
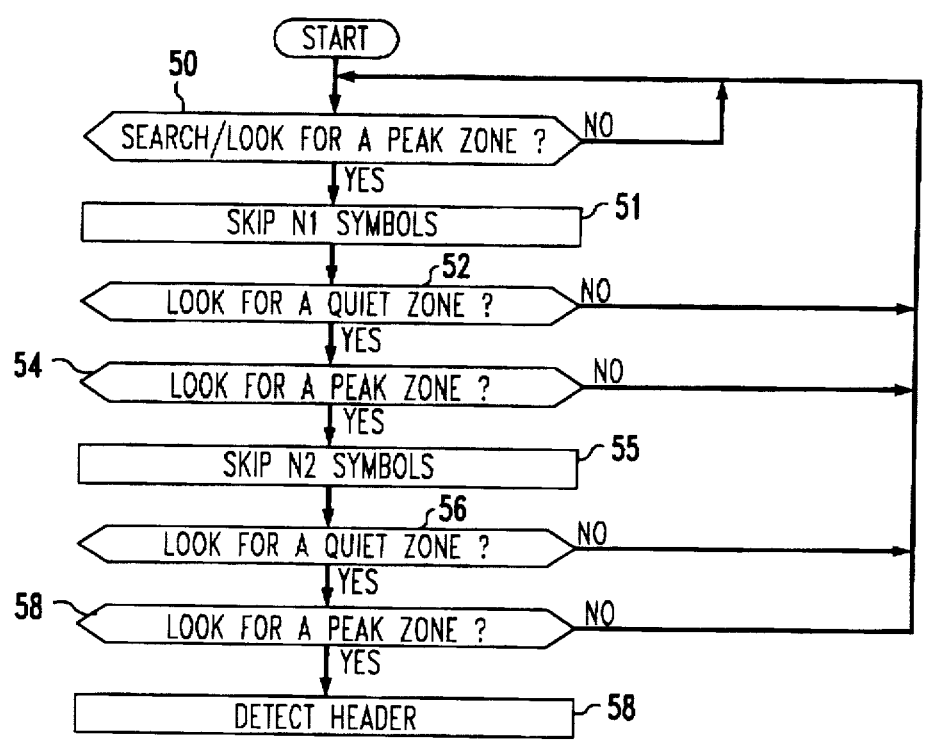
Figure 13:
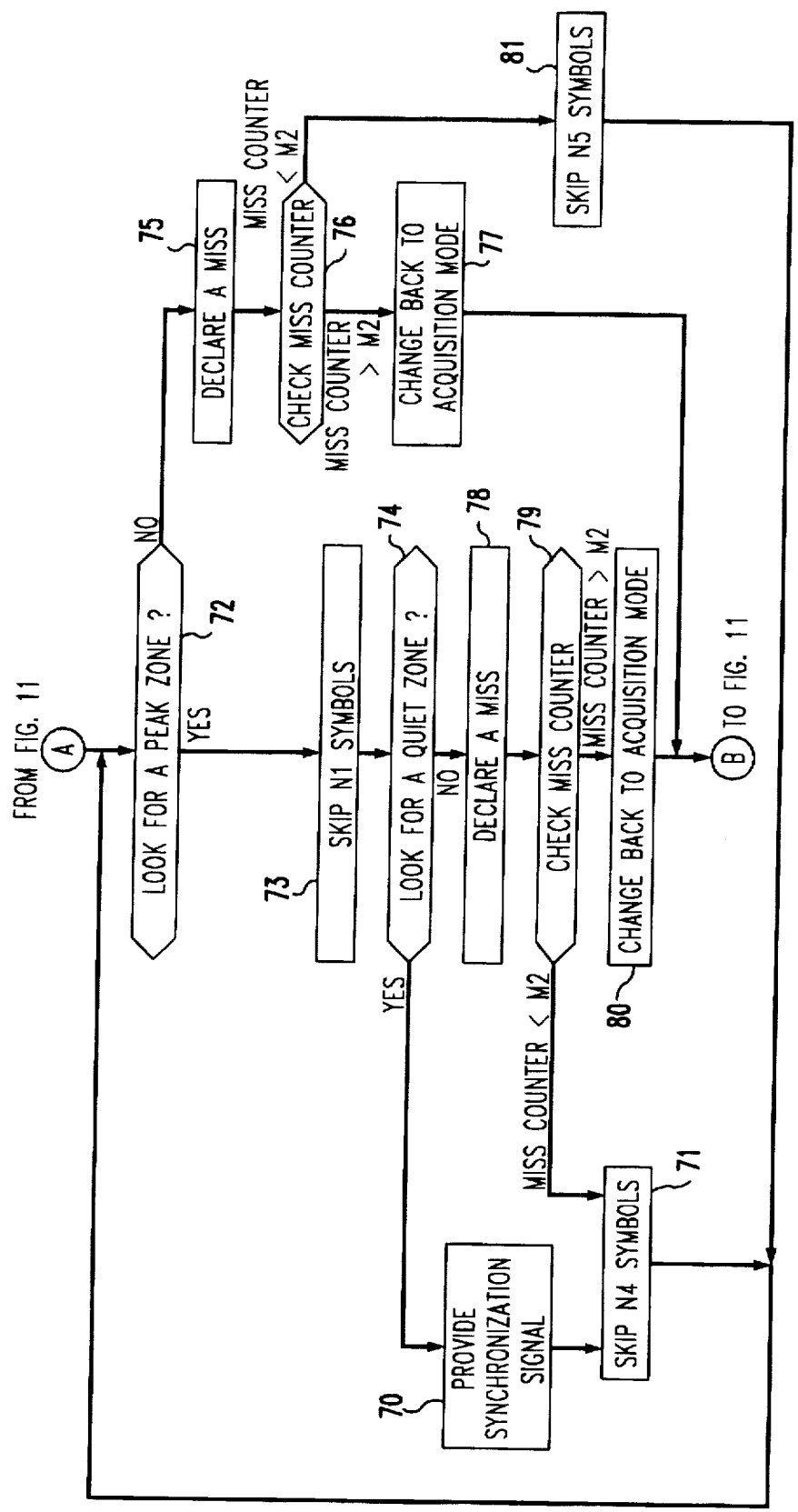

Essentially, this synchronization process looks at the highs and lows and the periodicity, of the framing signal. Notwithstanding a high match during the peak detection zone, a low match during the quiet detection zone is used to verify the beginning of a frame. The ignoring zone compensates for reflections, delays, etc., to the received signal. This general method for use in decision device 565 is shown in FIGS. 11, 12, and 13.

Figure 11:
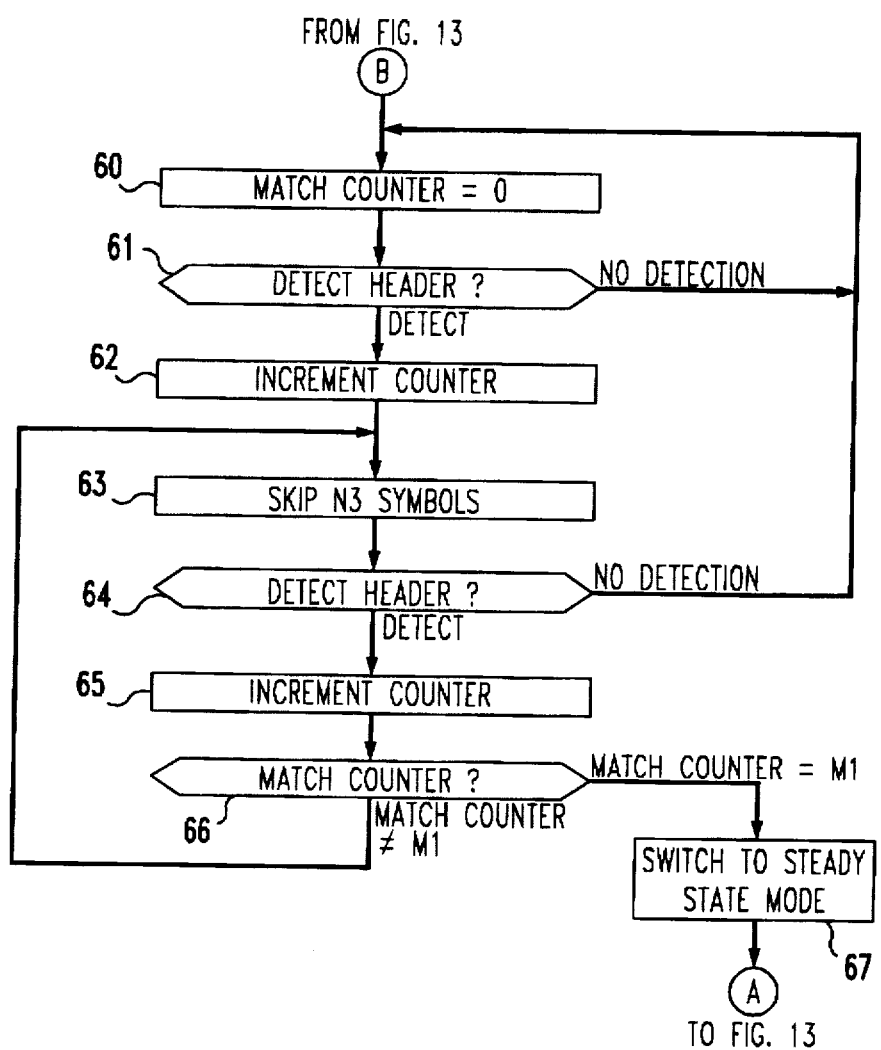
FIGS. 11, 12, and 13 show an illustrative synchronization method for use in receiver 300.

Initially, when receiver 300 is first tuned in to a respective frequency, decision device 565 begins in an "acquisition mode" as shown in FIG. 11, in which no synchronization is declared. A match counter, which illustratively can be a variable or a register, is initially set to zero in step 60. In step 61, the synchronization process attempts to detect a header. Once a header is detected, the match counter is incremented in step 62, a plurality of symbols, $n_3$, is skipped in step 63, and an attempt to detect a header is again performed in step 64. The plurality of symbols, $n_3$, is related to the frame length (described below). If no header is detected, decision device 565 returns to step 61. However, if a header is detected, the match counter is incremented in step 65. If the match counter is equal to a predefined number, $M_1$, then decision device 565 switches to "steady state mode" in step 67 and operates in accordance with FIG. 13 (described below). For example, if $M_1$ is equal to three, then once three consecutive headers are detected the transition to steady state mode occurs and a synchronization (sync) signal can be asserted. This requirement of sequentially matching a plurality of headers establishes a level of confidence before declaring synchronization and switching to a "steady state mode." However, if the match counter is not equal to $M_1$, the decision device 565 skips $n_3$ symbols and goes to step 63. It should be noted that the value of the predefined number $M_1$, can be static or variable. For example, when the receiver is initially turned on (or when a station is first tuned in), the value of $M_1$ can be higher than a value for $M_1$ when the return to acquisition mode was a result of a loss of synchronization. This would enforce a higher confidence level when first acquiring the signal. However, a lower confidence level can be tolerated in handling resynchronization.

The difference between the steps 61 and 64 is one of presumption about the position within each received frame when attempting to detect a header. In the context of step 61, detection of the header is started at any point within the received signal. That is, the received signal is "searched" for a peak zone in step 61 of FIG. 11. Once a header is initially detected, if it was a true header, a similar detection should occur at the start of the next frame, which is a fixed time interval latter, as represented by the skipping of $n_3$ symbols. In this context, the header detection of step 63 "looks" for the header at the appropriate time interval latter (since the periodicity of the signal is known a priori, the data signal portion of a frame is easily skipped.)

As a result, although shown separately, steps 61 and 64 essentially detect the header in the same fashion. This is illustrated in FIG. 12, which shows a flow chart of an illustrative header detection method. In step 50, the synchronization process searches for a peak zone, i.e., decision device 565 waits for the detection of any indication of a peak zone from confidence counter 540. Upon detection of a peak zone, the synchronization process skips $n_1$ symbol intervals in step 51, to compensate for any signal reflections, etc., (this is an ignoring zone). In the next step, 52, the synchronization process looks for a quiet zone. If no quiet zone is detected within a predefined time interval, the synchronization process returns to step 50 to search for a peak zone. However, upon detection of a quiet zone, then decision device 565 looks for a peak zone in step 54 within a predetermined time interval. If no peak zone is detected, the synchronization process returns to step 50 to scan for a peak zone. However, upon detection of a peak zone in step 54, the synchronization process skips $n_2$ symbol intervals in step 55, to compensate for any signal reflections, etc., (this is another ignoring zone) where $n_2 \geq n_1$. The values of $n_1$ and $n_2$ are determined experimentally based on the knowledge of the worst case channel span. In the next step, 56, the synchronization process looks for a quiet zone. If no quiet zone is detected within a predefined time interval, the synchronization process returns to step 50 to search for a peak zone within a predetermined time interval. However, upon detection of a quiet zone, then decision device 565 looks for a peak zone in step 58. If no peak zone is detected, the synchronization process returns to step 50 to search for a peak zone. Upon detection of a peak zone, the synchronization process has detected a header. Notice that the sum of the time intervals elapsed in skipping ignoring zones and searching for peaks and quiet zones are designed in such a way that the periodicity of 31PN is taken advantage of.

Once in a steady-state mode, the above-described method of FIG. 12 can also be used for every frame. Alternatively, other methods can be used, one of which is illustrated in FIG. 13. In the latter, a miss counter, which illustratively can be a variable or a register, is initially set to zero. In step 72, decision device 565 looks for a peak zone within the next frame, which in this example occurs $n_4$ symbols latter. Here, $n_4 > n_3$ since, as will be described, only the first peak and quiet zone are detected, hence more of the frame needs to be skipped. If a peak zone is detected, decision device 565 skips $n_1$ symbol intervals in step 73 and looks for a quiet zone in step 74. However, if no peak zone is detected, a miss is declared in step 75 and the miss counter is incremented. The value of the miss counter is checked in step 76. If the value of the miss counter is greater than a predetermined number $M_2$, then decision device 565 changes back to acquisition mode, i.e., synchronization is lost and decision device 565 operates in accordance with FIG. 11, described above. Otherwise, decision device 565 goes to step 81 and hence to step 72 as described above. The value of $n_5$ is greater than $n_4$ since more symbols need to be skipped (as represented by the time to process steps 73, 74, 78, and 79).

In step 74, if a quiet zone is detected, decision device 565 provides a sync signal in step 70, skips $n_4$ symbols in step 71, and looks for a peak zone at the beginning of the next frame in step 72. However, if no quiet zone is detected, a miss is declared in step 78 and the miss counter is incremented. The value of the miss counter is checked in step 79. (It is assumed herein that a miss is represented by an invalid sync signal, e.g., a logical ZERO versus a logical ONE, or if the sync signal is a multi-bit signal, a particular bit pattern. Alternatively, a separate signal could be provided by decision device 565.) If the value of the miss counter is greater than a predetermined number $M_2$, then decision device 565 changes back to acquisition mode, i.e., synchronization is lost and decision device 565 operates in accordance with FIG. 11, described above. Otherwise, decision device 565 goes to step 71 and continues the process. In this example, the miss counter is allowed to increment until reaching the above-mentioned threshold. However, variations can be used to reset the miss counter. For example, the miss counter can be periodically reset if no miss is detected within a predetermined time period. Or, the miss counter can be reset every time a synchronization signal is provided in step 70.

Also, it should be noted that a miss in detection, or a lack of synchronization, can be advantageously used to indicate the channel signal-to-noise condition. For example, in case of a miss in detection, or a lack of synchronization, a signal (e.g., the sync signal) is sent to the Reed-Solomon decoder. The latter then ignores the current received frame for the purpose of correcting errors. This is more efficient than accumulating error information on a received signal over a period of time as is typical in prior art systems referred to as an erasure in a Reed-Solomon decoder. For example, it is known to develop error statistics based upon slicing an output signal of an equalizer. When the error accumulates above a certain threshold, circuitry like a Reed-Solomon decoder subsequently ignores the received signal for a period of time. However, simply using the above-mentioned sync signal eliminates this circuitry.

As described above, the sounding signal is transmitted every 10 ms. Based on theoretical and experimental results, it has been determined that this limits the upper vehicle speed to between 135 and 200 km/hour depending on the severity of the communications channel. The ability to deal with vehicle speed is linearly increased with an increase in the repetition rate of the sounding signal. For example, if the sounding signal is transmitted every 5 ms., the upper vehicle speed should lie in the range of 270 to 400 km/hour.

It should be noted that other methods could also be used to determine synchronization using the circuitry of FIG. 5. For example, in contrast to the above serial approach to evaluating the output signals of confidence counter 540, as described in FIGS. 11 and 12, a joint decision type of analysis could be used.

Once frame synchronization is accomplished, the channel impulse response embedded in correlator output signal 526 is processed to obtain equalizer coefficients for equalizer 570. In particular, once synchronization is declared, the predefined header, i.e., the training signal, is identified and is used to represent the channel impulse response. This is particularly useful because a mobile wireless channel is characterized by the presence of multiple reflection paths. As such, the received signal can be viewed as composed of a main signal and a significant number of indirect signals caused by reflections. Reception difficulty is further increased by continual change in the channel and becomes even more difficult when data symbols are transmitted at a rate higher than a few hundred Khz. For example, a few micro-seconds delay between paths causes intersymbol interference among many data symbols. As a result, to recover data in this type of communications environment, channel characteristics are needed for correcting the impairments caused by the channel.

Channel characterization can be described as follows. At the transmitter, a known training signal is sent through an unknown channel. At the receiver, the observed received signal is used to characterize the channel. We define $A(f)$ as the training signal frequency spectrum, $H_t(f)$ as the transmitter frequency response, $H_c(f)$ as the channel frequency response, $H_u(f)$ as the tuner frequency response, $B(f)$ as the channel characterizer's frequency response at the receiver, and $T(f)$ as the total frequency response. (For now, we assume that the system is noiseless.)

$$T(f) = A(f) \, H_t(f) \, H_c(f) \, H_u(f) \, B(f) \quad (12)$$

If $A(f) \, B(f)$ equals a constant k over the transmission band, hereafter referred to as the "processing gain," then $$T(f) = k \, H_t(f) \, H_c(f) \, H_u(f), \quad (13a)$$

or $$T(f) = k \, H(f), \quad (13b)$$

where $H(f)$ is the overall transfer function and the channel information is obtained. Using this information, equalizer tap coefficients can be obtained for correcting channel distortion. The following described techniques precisely characterize a multi-path channel and provide various kinds of information for synchronization, and carrier phase offset estimation, as described above.

If the channel is corrupted by noise, then $$T(f) = kH(f) + \sqrt{kN(f)}, \quad (14)$$

where $N(f)$ is the channel noise power spectrum and k is the processing gain as described above. The ratio $k|H(f)|^2/N(f)$, integrated over the transmission band, defines the channel estimate signal-to-noise ratio. The larger the processing gain, the better protection to the estimated channel characteristics from noise. In general, the longer the training signal lasts, the better the characterization of the respective communications channel. In this design, the training signal corresponds to the above-mentioned header. Consequently, there is a compromise between the transmission overhead and the amount of time dedicated to characterizing the communications channel. This tradeoff is represented herein by the selection of 86 symbols in header 206 as the length of the training signal for synchronization and channel sounding purposes.

As noted earlier, equalizer 570 forms a Hilbert pair, so coefficients for the in-phase and quadrature equalizers of equalizer 570 can be obtained from the in-phase channel response only. As such, allocate channel response element 535 first finds the in-phase channel impulse response embedded in correlator output signal 526. The quadrature equalizer coefficients are then obtained through a Hilbert transform.

Figure 14:
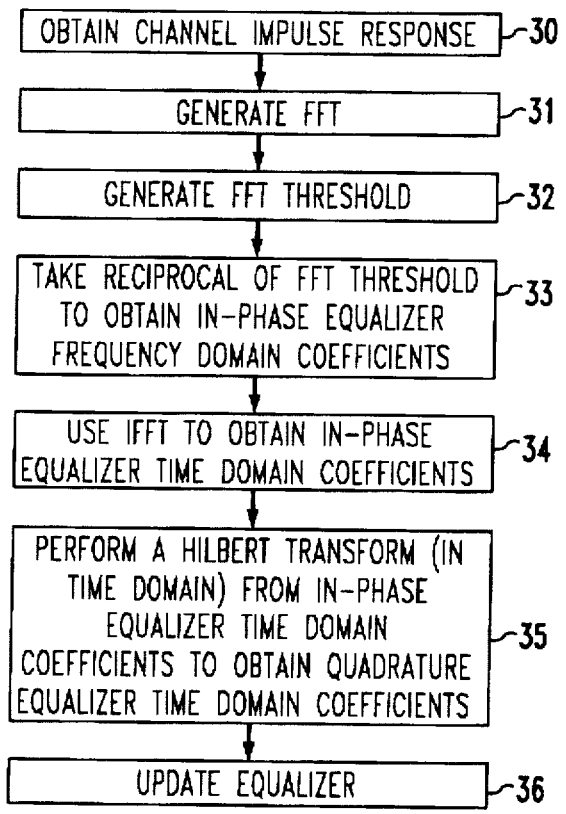
FIG. 14 shows an illustrative method for computing equalizer coefficients for use in receiver 300.

An illustrative process for obtaining linear equalizer coefficients is shown in FIG. 14. (It is possible to use variations of a decision feedback equalizer, refer to U.S. Patent Application by Gadot et al., Ser. No. 08/322,877, filed on Oct. 13, 1994 and allowed on Nov. 15, 1995.). In step 30, allocate channel response element 535 receives the sync signal from detection device 565 signaling that correlator output signal 526 is representative of the channel impulse response. In step 31, allocate channel response element 535 transforms correlator output signal 526 from the time-domain into a frequency domain representation in accordance with a "fast Fourier transform" (FFT) or discrete Fourier transform (DFT) technique (FFT and DFT processing is known in the art). Normally, the equalizer coefficients can be simply determined by then taking the reciprocal of the FFT output (for frequency domain equalization) and the inverse FFT (IFFT) to go back to the time domain (for time domain equalization).

However, excessive equalizer noise enhancement may be due to the presence of multi-path reflections. This is particularly true for large reflections, e.g., identical strength reflections. As such, the equalizer coefficients generated from the FFT response alone may not provide for convergence and, instead, make inter-symbol interference (ISI) recovery difficult.

Figure 15:
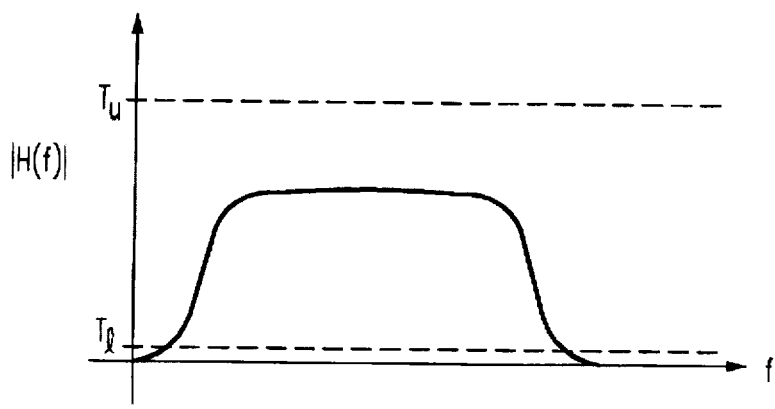
FIG. 15 illustrates the "FFT thresholding" used to compute equalizer coefficients for use in receiver 300.

Therefore, I have realized that by introducing a little distortion into the channel impulse response, multiple reflections can be handled with only a slight degradation in overall performance. In particular, the channel impulse response is clipped in the frequency domain if the received signal is too high or too low, hereafter referred to as "FFT thresholding." In other words, a simple threshold is applied to the magnitude of the FFT of correlator output signal 526 as illustrated in FIG. 15. If the FFT of correlator output signal 526 exceeds these predetermined thresholds, $T_h$ and $T_l$, the signal is simply clipped. For example, if the magnitude is greater than $T_h$, the magnitude is set equal $T_h$. Similarly, if the magnitude is less than $T_l$, the magnitude is set equal $T_l$. The determination of the thresholds is a compromise between the magnitude of the reflections expected and the degree of ISI that is acceptable and must be determined empirically.

This FFT thresholding approach avoids excessive equalizer noise enhancement in equalization due to the multi-path environment. Analogously, it can be viewed as equalization using some type of minimum-mean-squared criterion as opposed to zero-forcing equalization. It is also important that to avoid the circular convolution effect in the digital frequency and time transformations, the length of the FFT and the IFFT should exceed the sum of the worst case channel and equalizer spans to avoid cyclical alias in performing FFT and IFF operations. Finally, the out-of-band response is set to zero in the frequency domain to design the equalizer with a 180 Khz bandpass characteristic between 60 to 240 Khz.

Returning to FIG. 14, allocate channel response element 535 applies FFT thresholding in step 32. The reciprocal of the FFT threshold is taken in step 33. The resulting frequency domain response is then processed using an inverse FFT (IFFT) as known in the art to obtain the in-phase equalizer coefficients in step 34. Finally, allocate channel response element 535 processes the in-phase equalizer coefficients via a Hilbert transform in time domain to obtain the quadrature equalizer coefficients in step 35.

Once equalizer coefficients are obtained, allocate channel response element 535 updates, or down-loads, the coefficients to equalizer 570 in step 36. As noted above, delay line 530 must regulate the sample flow such that equalizer 570 sees the proper data stream. The length of this data buffer takes into account the time to process the channel impulse, the equalizer coefficients calculation and the delay that is needed to implement equalization. It is important that the sampling phase relationship is properly maintained through all the signal processing and delay circuitry. After the delay buffer, the equalizer processes two partial data blocks, one half data block before and another half after the 100-symbol synchronization pattern. This is the so-called mid-amble equalization. Note that the equalizer is a pass-band equalizer. The same data stream is fed to the in-phase portion of equalizer 570 as well as the quadrature portion of equalizer 570. The output of the equalizer 570 is re-sampled at the symbol rate and provided to the carrier recovery loop 580, described earlier. The output of the carrier recovery circuitry is then sliced to recover transmitted symbols.

Figure 16:
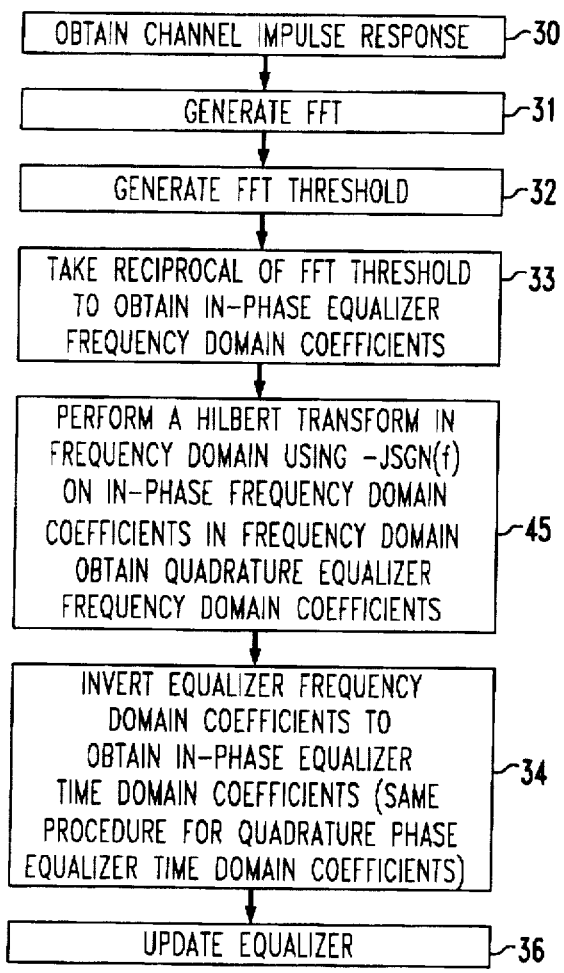
FIG. 16 shows another illustrative method for computing equalizer coefficients for use in receiver 300.

A variation of the method of FIG. 14 for computing equalizer coefficients is shown in FIG. 16. The latter is identical to FIG. 14 except for replacing step 35 by step 45 and moving step 36. In step 45, the in-phase equalizer coefficient in frequency domain is processed via a $-jsgn(f)$ (the frequency domain representation of a Hilbert transform), which generates the quadrature phase equalizer coefficient in frequency domain, from which the time domain coefficients for the quadrature are generated by taking IFFT in step 34.

Figure 17:
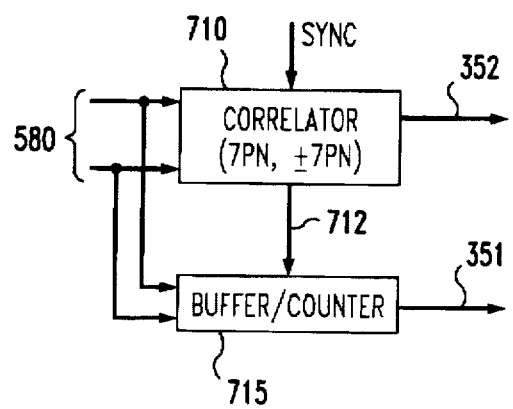
FIG. 17 shows an illustrative block diagram of symbol recovery element 705 for use in receiver 300 of FIG. 1.

Returning to FIG. 5, the phase-corrected symbol stream provided by digital carrier recovery loop 580 is provided to symbol recovery element 705, which provides encoded signal 351, described earlier. Symbol recovery element 705 is shown in block diagram form in FIG. 17, and comprises correlator 710 and buffer-counter 715.

As a reminder, the remaining 14 one-dimensional symbols of header 206 are used for either interleaver synchronization or symbol clock alignment in receiver 300. These 14 one-dimensional symbols are selected from the "interleaver (symbol clock) sync symbols" of the signal point constellation of FIG. 3. In particular, the 14 symbols are used by receiver 300 to indicate the beginning of each 320 ms interleaver block. This interleaver synchronization is repeated every 32 frames and comprise two consecutive 7PN sequences as shown in FIG. 4. (It should be noted that interleaver depth, i.e., the size of the interleaver block, effects the ability to recover the signal from obstructed terrain and also is a function of the lower limit of vehicle speed. Consequently, other values of interleaver depth can be used, depending upon particular system characteristics. For example, if a higher incidence of obstructed terrain is present in the broadcast area, the interleaver depth could be adjusted to 640 ms.)

When the 14 symbols are not used for interleaver synchronization at receiver 300, they are used for data symbol synchronization in the associated frame. In this instance, the 14 symbols comprise one negative 7PN followed by a positive 7PN as shown in FIG. 4. This is needed to align the encoded data portion of each frame whenever there is a significant sample time phase change or the relative strength of different signal paths changes and causes a change in the delay seen by receiver 300. (It should be noted that in this context, a negative PN sequence is simply the opposite of a positive PN sequence. For example, if a 2PN was represented by the symbols (1.414,0; -1.414,0), the corresponding negative 2PN is the symbol sequence (-1.414,0; 1.414, 0).

As such, correlator 710 is similar in function to the above-described correlator 525, confidence counter 540, and decision device 565 except that it has an additional information signal—the sync signal, which establishes frame synchronization for the current received frame (as a result, correlator 710 can be a simpler binary correlator). During a valid frame (as represented by a valid sync signal), correlator 710 provides interleaver synchronization signal 352 for subsequent use by error protection decoder 315, as shown in FIG. 1, to de-interleave the symbol blocks upon detection of two consecutive 7PN sequences of the same sign. Similarly, correlator 710 provides a data symbol synchronization signal 712 upon detection of two consecutive 7PN sequences of opposite sign or upon the detection of the interleaver synchronization sequence. The latter condition ensures symbol synchronization even during that frame indicating the start of a new interleaver block. It should be noted that by using two 7PN sequences of the same sign for interleaver synchronization and two 7PN of the opposite sign (one positive and one negative) for symbol synchronization, the receiver decoding is designed to be phase-rotation invariant. This provides additional protection to this very important time stamp information in case of a severe channel.

Buffer-counter 715 is responsive to data symbol synchronization signal 712 and buffers the data-only portion of the current frame. The implementation of buffer-counter 715 can be done in any number of ways. For example, as a linear buffer, or a circular buffer, additions and deletions are performed using a pointer and a counter. In storing the current received symbols it is assumed that buffer-counter 715 performs the following functions. First, buffer-counter 715 hard slices the received symbol stream. (For simplicity, the slicer—an element known in the art—is not shown). The sliced received symbol stream is then stored. Ideally, the number of sliced symbols stored should equal or be greater than the predefined size of a data block, i.e., 1700 data symbols. However, a timing offset can cause either more, or less, data symbols to be associated with the current received frame. This timing offset is due to misalignment of the transmitter and receiver clocks and to the multi-path aspects of the communications channel itself.

With respect to the transmitter and receiver clocks, the above-described estimated channel impulse response obtained from channel sounding has the timing phase offset information between the transmitter and the receiver symbol clocks. A fractional-spaced equalizer using coefficients derived from the estimated channel response can compensate for the timing phase shift to a limited extent since the equalizer may be kept frozen until the next synchronization comes. If the transmitter and receiver clocks have a frequency difference, a timing phase offset gradually increases from zero to a certain value before the new estimate arrives. It is well-known that the sensitivity to this problem depends on the transmitter filter excessive bandwidth. For example, if a transmission system uses a zero percent excessive bandwidth transmitter filter (sinx/x), a 4% timing phase offset (15 degrees) will introduce an interference −23 dB below the signal. When this interference is added to the noise, it causes a 0.3 dB degradation to receiver sensitivity. If a transmitter filter with about 10% excessive bandwidth is used, this is comparable to an 11% timing phase offset. The maximum allowed receiver symbol clock inaccuracy from the following equation:

$$D \left( \frac{1}{T_{sym}} - \frac{\text{symbols in data block}}{2} T_{sym} \right) \leq \text{allowed timing offset}, \quad (15)$$

where D is the maximum allowed receiver symbol clock drift from that of the transmitter and a division by two is due to mid-amble equalization. For a timing offset of 11% and a data block size of 1800 symbols, D=120 ppm (parts per million). As long as the receiver symbol clock is within ±120 ppm from the transmitter symbol clock, the timing phase will not change significantly over the data block to cause a significant performance degradation.

Another case that can cause delete or add of symbols is when a multi-path channel varies. For example, when the relative strength of all paths change, the equalizer always takes the one with the strongest power as the main signal and produces recovered symbols accordingly.

In any event, the end result is that if there is a time shift in the symbol alignment, more, or less, data symbols may exist in the current received frame. This symbol time shift will likely occur when the equalizer coefficents are changed. Therefore, buffer-counter 715 measures the number of data symbols between any two consecutive double 7PN sequences as represented by data symbol synchronization signal 712. When there is an additional symbol, the one in the middle of the block is deleted. If the number of symbols is less than the 1700, the middle symbol is repeated. In such a situation an error may occur. While the signal format design can take into account this problem, for simplicity of implementation this condition can be ignored and, instead, the Reed-Solomon decoder (not shown) with error protection decoder 315 can be relied on to correct for this problem. This cause a minor degradation in overall system performance. It should be noted that since a mid-amble equalizer is used, two consecutive data blocks are buffered to perform this symbol re-alignment.

The foregoing merely illustrates the principles of the invention and it will thus be appreciated that those skilled in the art will be able to devise numerous alternative arrangements which, although not explicitly described herein, embody the principles of the invention and are within its spirit and scope.

For example, although the invention is illustrated herein as being implemented with discrete functional building blocks, e.g. a perceptual audio coder, allocate channel response element, etc., the functions of any one or more of those building blocks can be carried out using one or more appropriate programmed processors, e.g., a digital signal processor.

What is claimed:

1. An apparatus for use in a communications receiver, the apparatus comprising:
    a frame detector for providing a frame synchronization signal that is representative of whether a received frame is valid or invalid;
    said frame detector having a correlator for processing a first signal to provide a correlated signal, the first signal being representative of a sequence of frames, each frame comprising a plurality of symbols and further divided into a header portion and a data portion;
    a matching circuit for comparing the correlated signal to at-least-one predetermined signal pattern indicative of the header portion of each frame and for generating the frame synchronization upon detection of the header portion; and
    error correcting circuitry that is inhibited by the frame synchronization signal from correcting an invalid received frame.

2. The apparatus of claim 1 the correlator compares the first signal to a predetermined set of psuedo-random number values.

3. A method for use in a receiver, the method comprising the steps of:
    generating a frame detection signal representative of whether a received frame is valid or invalid;
    inhibiting an error correction system from operating when the frame detection signal is representative of an invalid received frame independent of an error rate for the invalid received frame wherein the generating step includes the steps of
    correlating a first signal with a predefined signal to provide a correlated signal;
    comparing the correlated signal to a predefined set of signal patterns;
    indicating a valid received frame when the correlated signal matches the predefined set of signal patterns; and
    indicating an invalid received frame when the correlated signal does not match the predefined set of signal patterns.

4. The method of claim 3 wherein the predefined signal is a predetermined sequence of psuedo random numbers.

5. A method of claim 3 wherein the comparing step includes the step of comparing an amplitude of the correlated signal to a predetermined set of high and low threshold amplitude values.

6. The method of claim 5 wherein the predefined set of signal patterns are associated with a particular pattern of when the correlated signal should exceed the high threshold amplitude and be less than the low threshold amplitude.

* * * * *